(12) United States Patent
Horng (10) Patent No.: US 9,547,342 B2
(45) Date of Patent: Jan. 17, 2017

(54) SEGMENTAL ROTATION TYPE DUAL-SHAFT HINGE

(71) Applicant: Chin-Hsing Horng, Taoyuan (TW)

(72) Inventor: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 15/068,586

(22) Filed: Mar. 13, 2016

(65) Prior Publication Data

US 2016/0274625 A1 Sep. 22, 2016

(30) Foreign Application Priority Data

Mar. 17, 2015 (TW) .............................. 104203935 U (51) Int. Cl.
*G06F 1/16* (2006.01)

(52) U.S. Cl.
CPC ........... *G06F 1/1681* (2013.01); *G06F 1/1616* (2013.01); *Y10T 16/5478* (2015.01)

(58) Field of Classification Search
CPC ..... G06F 1/1681; G06F 1/1616; H04M 1/022; H05K 5/0226; E05Y 2900/606; E05D 3/06; E05D 3/12; E05D 2011/085; E05D 2005/106; Y10T 16/547; Y10T 16/5478; Y10T 16/551; Y10T 16/54038
USPC ............. 16/366, 371, 342, 374; 361/679.27; 379/433.13; 455/575.3
See application file for complete search history.

(56) References Cited

U.S. PATENT DOCUMENTS

| 8,776,319 | B1 * | 7/2014 | Chang | G06F 1/1681 16/303 |
| 8,931,141 | B2 * | 1/2015 | Chen | H04M 1/022 16/366 |
| 8,959,716 | B2 * | 2/2015 | Hsu | E05D 3/06 16/302 |
| 9,021,658 | B1 * | 5/2015 | Yang | G06F 1/1681 16/366 |
| 9,057,215 | B1 * | 6/2015 | Horng | E05D 3/12 |
| 9,265,166 | B2 * | 2/2016 | Hsu | H05K 5/0226 |
| 9,274,566 | B1 * | 3/2016 | Horng | G06F 1/1681 |
| 9,290,976 | B1 * | 3/2016 | Horng | E05D 3/12 |
| 9,310,850 | B2 * | 4/2016 | Hsu | G06F 1/1681 |
| 2015/0040353 | A1 * | 2/2015 | Chen | G06F 1/1681 16/366 |
| 2015/0160695 | A1 * | 6/2015 | Su | E05D 3/12 16/366 |
| 2015/0245510 | A1 * | 8/2015 | Hsu | H05K 5/0226 16/250 |
| 2015/0309541 | A1 * | 10/2015 | Horng | E05D 3/12 16/250 |

* cited by examiner

*Primary Examiner* — William Miller (57) ABSTRACT

A segmental rotation type dual-shaft hinge includes an axle housing defining a first pivot shaft chamber and a second pivot shaft chamber, a first pivot shaft including a first shaft body pivotally coupled to the first pivot shaft chamber, a second pivot shaft including a second shaft body pivotally coupled to the second pivot shaft chamber, and an angle control plate having a first position-limit hole and a second position-limit hole respectively pivotally coupled to the first shaft body and the second shaft body and so configured that the distance from the center of the first position-limit hole to the center of the second position-limit hole is smaller than the distance from the axis of the first shaft body to the axis of the second shaft body, allowing rotation of the first pivot shaft and the second pivot shaft separately and stably.

6 Claims, 14 Drawing Sheets

SEGMENTAL ROTATION TYPE DUAL-SHAFT HINGE

BACKGROUND OF THE INVENTION

1. Field of the Invention

The present invention relates to hinge technology and more particularly, to a segmental rotation type dual-shaft hinge, which is practical for use in a dual leaf electronic device, ensuring smooth rotation of the cover member of the dual leaf electronic device relative to the base member thereof in a segmental manner.

2. Description of the Related Art

A dual leaf mobile electronic device (such as notebook, smart phone) generally uses a dual-shaft hinge to connect the base member and the display screen-incorporated cover member, allowing the display screen-incorporated cover member to be turned between the top surface of the base member and the bottom side thereof. When the display screen-incorporated cover member is turned relative to the base member, the pivot shafts of the dual-shaft hinge are rotated relative to the axle housing, and a friction resistance can be created to achieve positioning of the angular position of the pivot shafts. However, after a long use, the friction force will be reduced, affecting the positioning of the display screen-incorporated cover member relative to the base member. Further, the rotational sequence of the two pivot shafts of the dual-shaft hinge cannot be accurately controlled, affecting the stability and accuracy of the operation in opening or closing the display screen-incorporated cover member.

SUMMARY OF THE INVENTION

The present invention has been accomplished under the circumstances in view. It is therefore the main object of the present invention to provide a segmental rotation type dual-shaft hinge for dual leaf electronic device, which uses an angle control plate to let a first pivot shaft and a second pivot shaft be rotated separately in a proper order, enabling the cover member of the dual leaf electronic device to be opened from to the base member thereof or closed on it smoothly.

To achieve this and other objects of the present invention, a segmental rotation type dual-shaft hinge comprises an axle housing, a first pivot shaft, a second pivot shaft. and an angle control plate. The axle housing defines therein a first pivot shaft chamber and a second pivot shaft chamber. The first pivot shaft comprises a first shaft body pivotally coupled to the first pivot shaft chamber, and a first cut plane located on the periphery of the first shaft body. The second pivot shaft comprises a second shaft body pivotally coupled to the second pivot shaft chamber, and a second cut plane located on the periphery of the second shaft body. The angle control plate comprises a first position-limit hole and a second position-limit hole respectively pivotally coupled to the first shaft body and the second shaft body, a first abutment edge located in the first position-limit hole remote from the second position-limit hole, and a second abutment edge located in the second position-limit hole remote from the first position-limit hole. The inner diameter of the first position-limit hole mates with the outer diameter of the first shaft body of the first pivot shaft. The inner diameter of the second position-limit hole mates with the outer diameter of the second shaft body of the second pivot shaft. Further, the distance from the center of the first position-limit hole to the center of the second position-limit hole is smaller than the distance from the axis of the first shaft body to the axis of the second shaft body.

DETAILED DESCRIPTION OF THE PREFERRED EMBODIMENT

Referring to FIGS. 1-5, a segmental rotation type dual-shaft hinge in accordance with a first embodiment of the present invention is shown. The segmental rotation type dual-shaft hinge comprises an axle housing 1, a first pivot shaft 2, a second pivot shaft 3, an angle control plate 4, a positioning member 5 and two locating members 6.

The axle housing 1 comprises a base 11 having a flat first surface 12 located at a top side thereof and a second surface 13 located at a bottom side thereof in parallel to the first surface 12, a first bearing portion 14 smoothly curved from one lateral side, namely the right lateral side of the first surface 12 of the base 11 in direction toward an opposite lateral side, namely, the left lateral side of the first surface 12 of the base 11, a first pivot shaft chamber 15 defined between the first surface 12 of the base 11 and the first bearing portion 14, a second bearing portion 16 smoothly curved from one lateral side, namely, the left lateral side of the second surface 13 of the base 11 in direction toward an opposite lateral side, namely, the right lateral side of the second surface 13 of the base 11, and a second pivot shaft chamber 17 defined between the second surface 13 of the base 11 and the second bearing portion 16. The first bearing portion 14 and the second bearing portion 16 extend in reversed directions.

The first pivot shaft 2 comprises a first shaft body 21 pivotally coupled to the first pivot shaft chamber 15 of the axle housing 1, a first cut plane 22 located on the periphery of the first shaft body 21, a first connection bar 23 axially extended from one end of the first shaft body 21, a first stop flange 24 extended around one end of the first connection bar 23 adjacent to the first shaft body 21, a first start surface 25 located at one side of the first stop flange 24, and a first end surface 26 located at an opposite side of the first stop flange 24.

The second pivot shaft comprises a second shaft body 31 pivotally coupled to the second pivot shaft chamber 17 of the axle housing 1, a second cut plane 32 located on the periphery of the second shaft body 31, a second connection bar 33 axially extended from one end of the second pivot shaft 3, a second stop flange 34 extended around one end of the second connection bar 33 adjacent to the second shaft body 31, a second start surface 35 located at one side of the second stop flange 34, and a second end surface 36 located at an opposite side of the second stop flange 34.

The angle control plate 4 is located at one lateral side of the axle housing 1, comprising a first position-limit hole 41 and a second position-limit hole 42 respectively disposed in alignment with the first pivot shaft chamber 15 and second pivot shaft chamber 17 of the axle housing 1. The inner diameter of the first position-limit hole 41 mates with the outer diameter of the first shaft body 21 of the first pivot shaft 2. The inner diameter of the second position-limit hole 42 mates with the outer diameter of the second shaft body 31 of the second pivot shaft 3. The first shaft body 21 of the first pivot shaft 2 and the second shaft body 31 of the second pivot shaft 3 are respectively and pivotally coupled to the first position-limit hole 41 and second position-limit hole 42 of the angle control plate 4. The angle control plate 4 further comprises a first abutment edge 411 located in the first position-limit hole 41 at one side remote from the second position-limit hole 42, a second abutment edge 421 located in the second position-limit hole 42 at one side remote from the first position-limit hole 41. Further, the distance from the center of the first position-limit hole 41 to the second position-limit hole 42 is smaller than the distance from the center of the first shaft body 21 to the axis of the second shaft body 31; the difference between the distance from the center of the first position-limit hole 41 to the axis of the first shaft body 21 and the distance from the center of the second position-limit hole 42 to the axis of the second shaft body 31 is equal to the difference between the radius of the first shaft body 21 and the distance from the axis of the first shaft body 21 to the first cut plane 22, and also equal to the difference between the radius of the second shaft body 31 and the distance from the axis of the second shaft body 31 to the second cut plane 32.

The positioning member 5 is attached to one side of the angle control plate 4 opposite to the axle housing 1, comprising a first positioning hole 51 and a second positioning hole 52 respectively disposed in axial alignment with the first position-limit hole 41 and second position-limit hole 42 of the angle control plate 4, and a stop block 53 located on one side thereof between the first positioning hole 51 and the second positioning hole 52. The stop block 53 comprises a first stop edge 531 and a second stop edge 532 bilaterally disposed at one side thereof adjacent to the first positioning hole 51, a third stop edge 533 and a fourth stop edge 534 bilaterally disposed at an opposite side thereof adjacent to the second positioning hole 52. The first positioning hole 51 and the second positioning hole 52 are respectively pivotally coupled to the first shaft body 21 and the second shaft body 31 so that the first stop flange 24 is disposed between the first stop edge 531 and the second stop edge 532 and the second stop flange 34 is disposed between the third stop edge 533 and the fourth stop edge 534.

The locating members 6 are respectively attached to the two opposite lateral sides of the axle housing 1, each comprising a first locating hole 61 and a second locating hole 62. The first locating holes 61 and second locating holes 62 of the locating members 6 are respectively pivotally coupled to the first shaft body 21 of the first pivot shaft 2 and the second shaft body 31 of the second pivot shaft 3.

Figure 1:
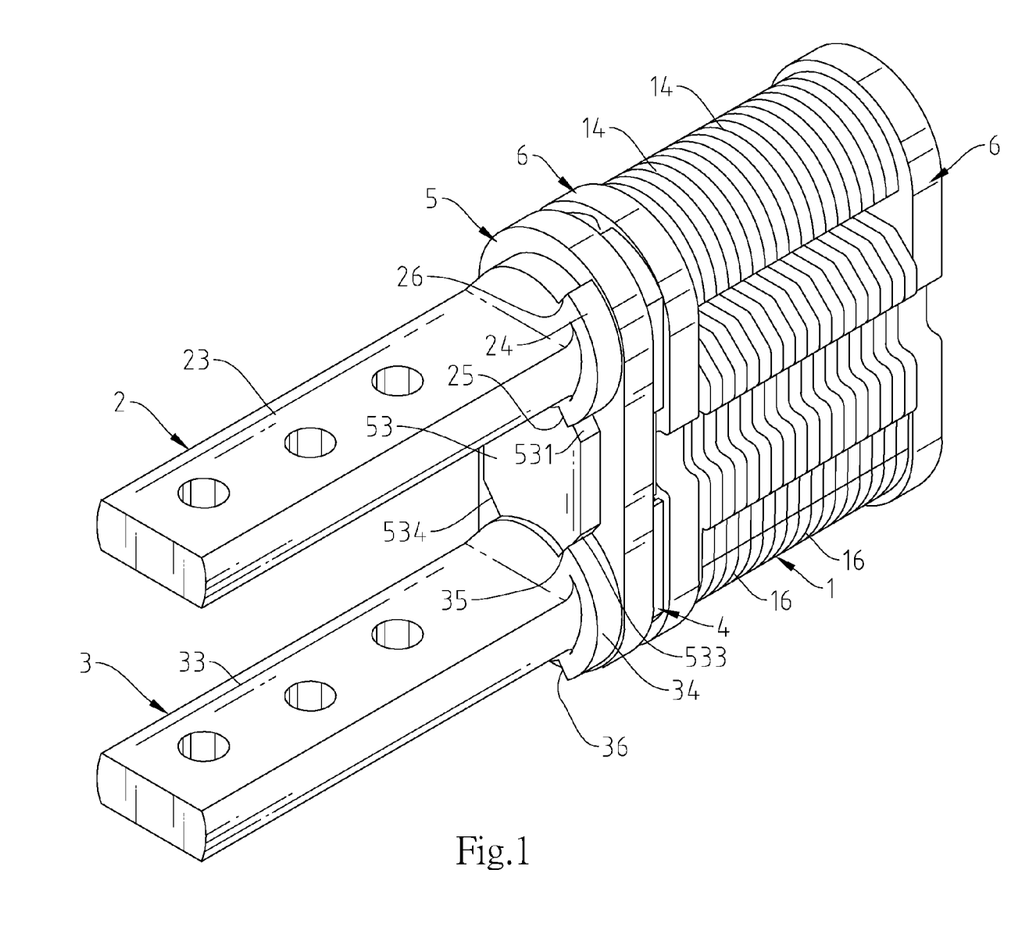
FIG. 1 is an elevational view of a segmental rotation type dual-shaft hinge in accordance with a first embodiment of the present invention.
Figure 2:
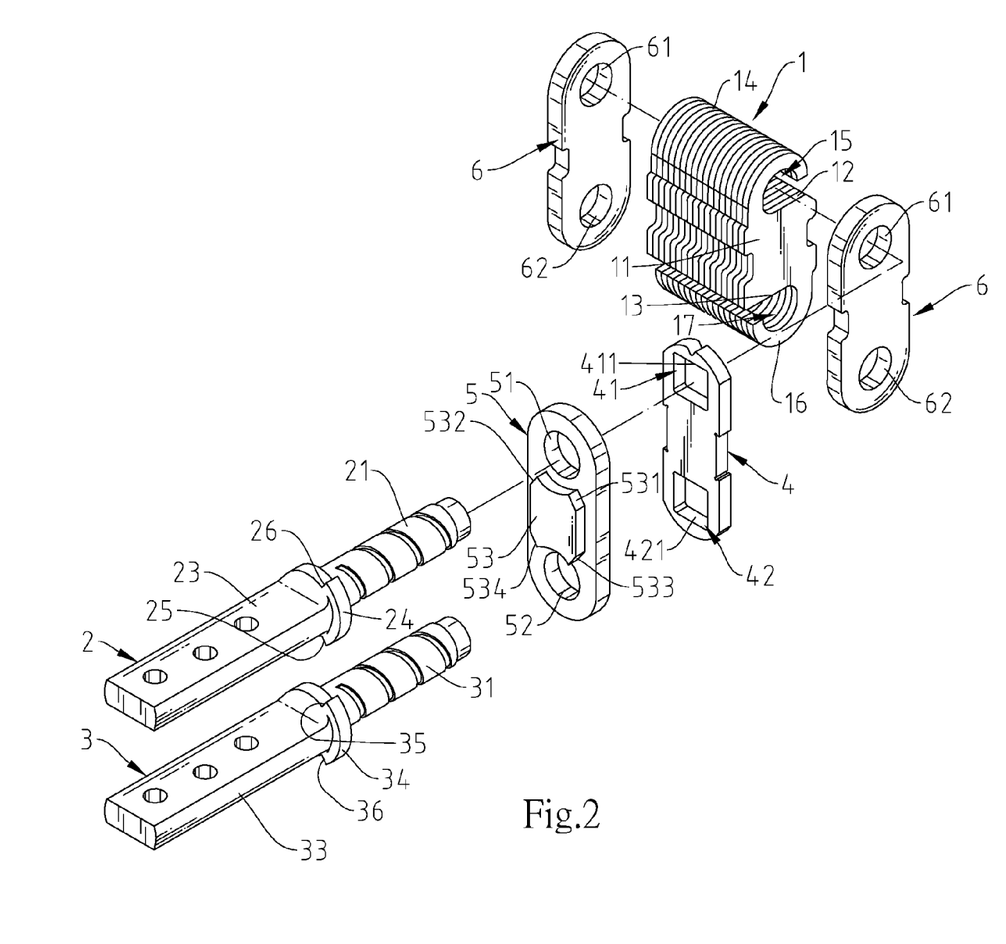
FIG. 2 is an exploded view of the segmental rotation type dual-shaft hinge in accordance with the first embodiment of the present invention.
Figure 3:
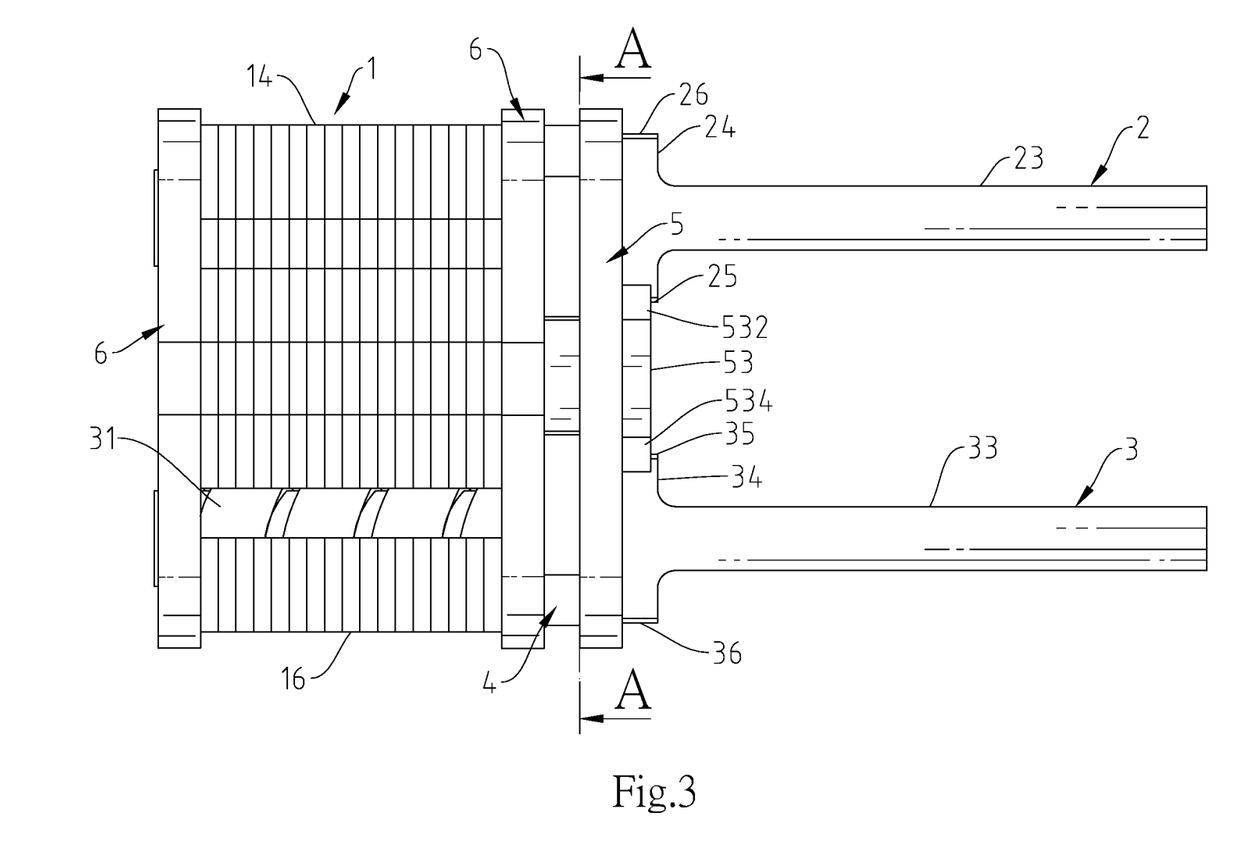
FIG. 3 is a front view of the segmental rotation type dual-shaft hinge in accordance with the first embodiment of the present invention.
Figure 4:
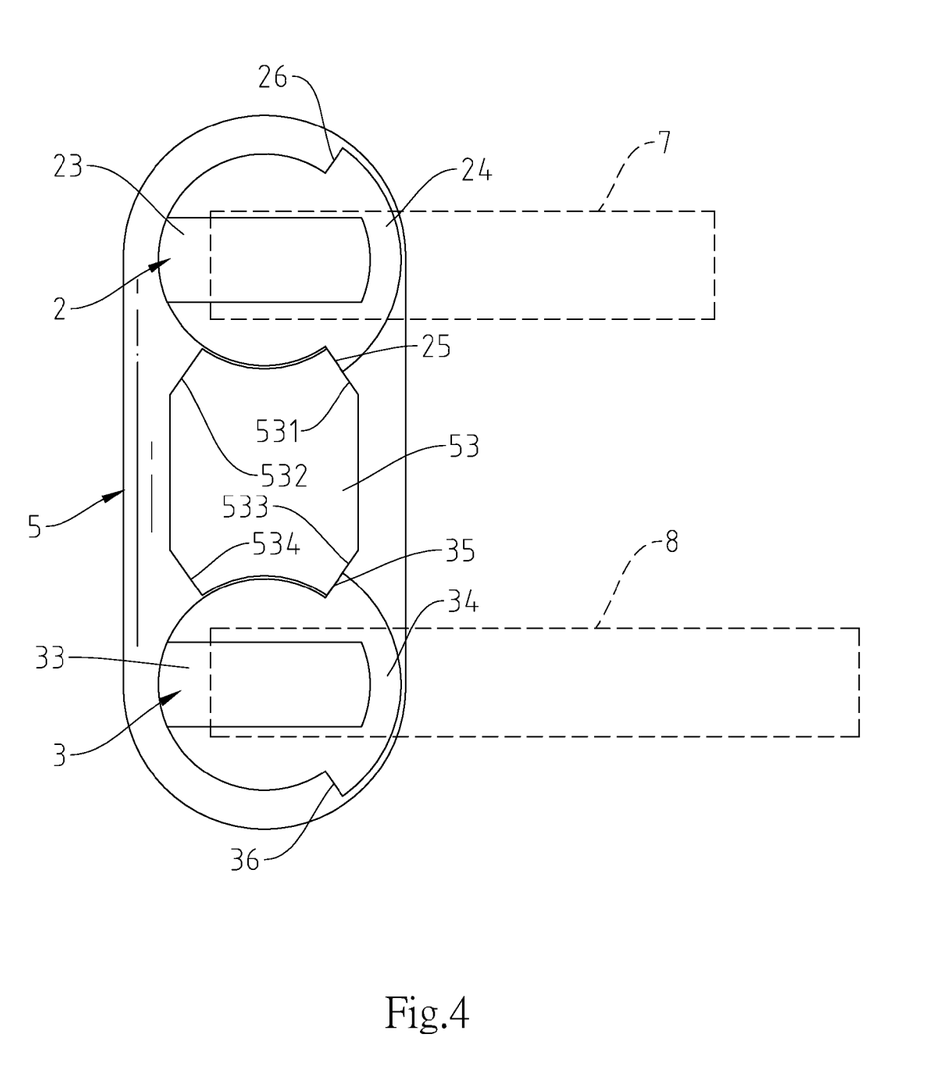
FIG. 4 is a schematic side view of the first embodiment of the present invention, illustrating the segmental rotation type dual-shaft hinge connected to a cover member and a base member of a dual leaf electronic device.
Figure 5:
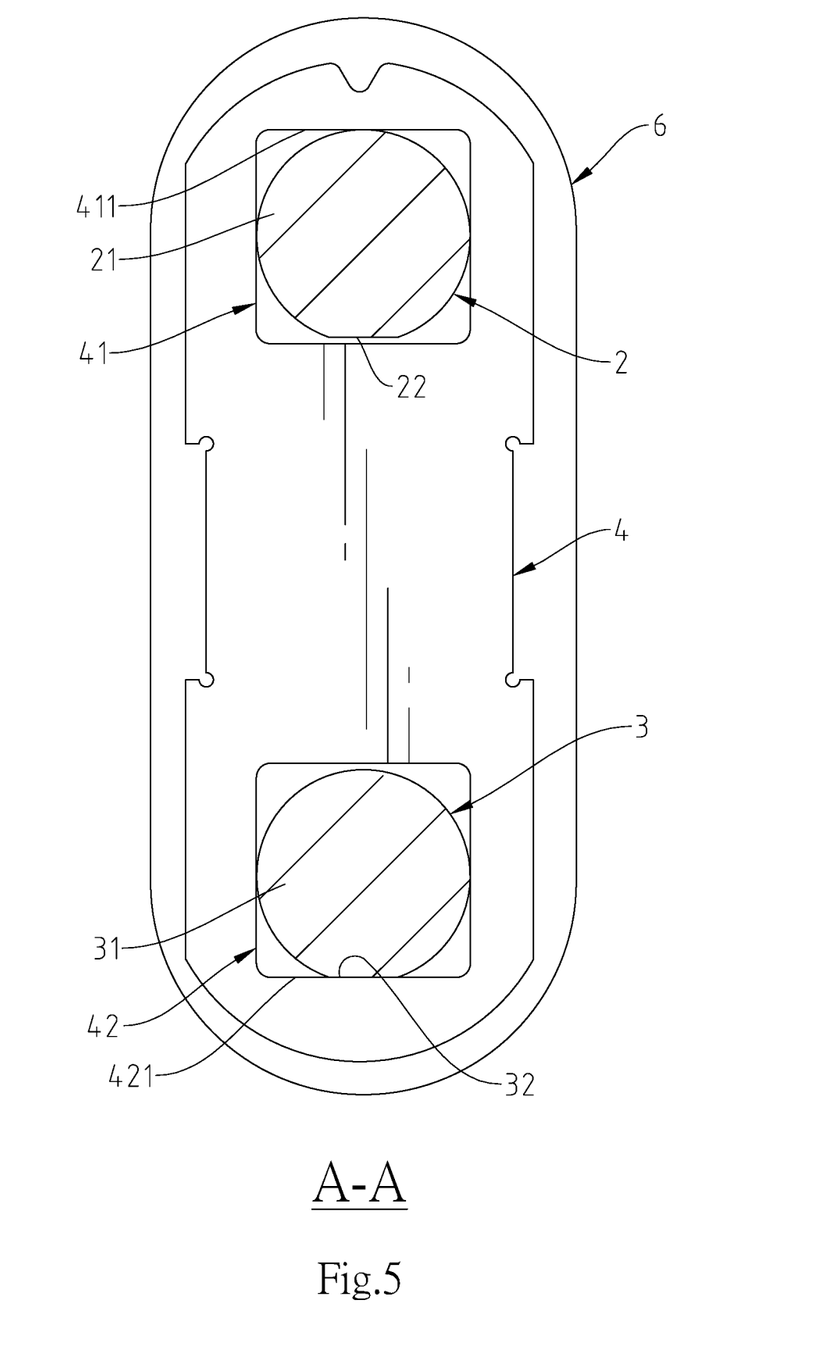
FIG. 5 is a sectional view taken along line A-A of FIG. 3.
Figure 6:
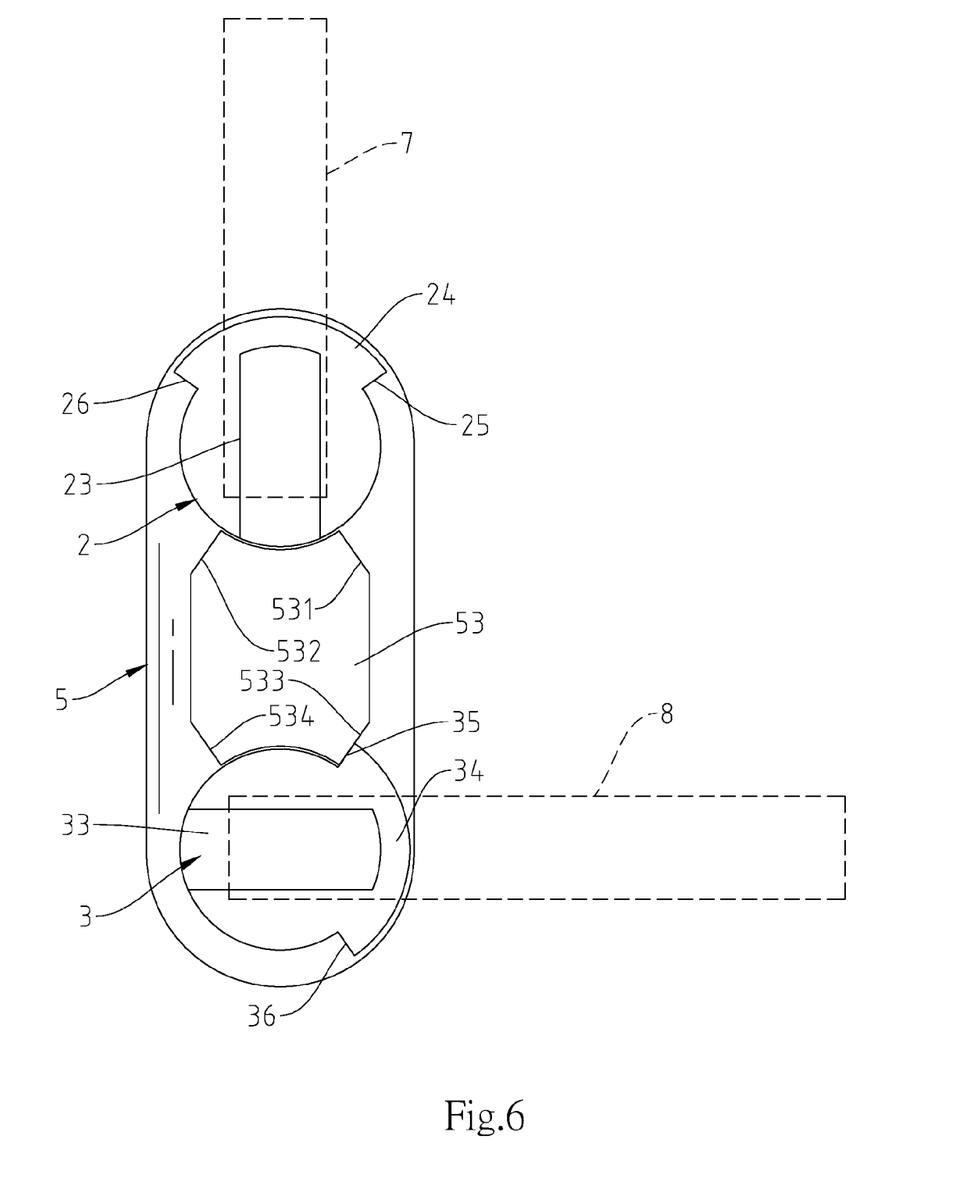
FIG. 6 is a schematic sectional operational view of the first embodiment of the present invention, illustrating the relative positioning between the first and second pivot shafts and the positioning member (I).
Figure 7:
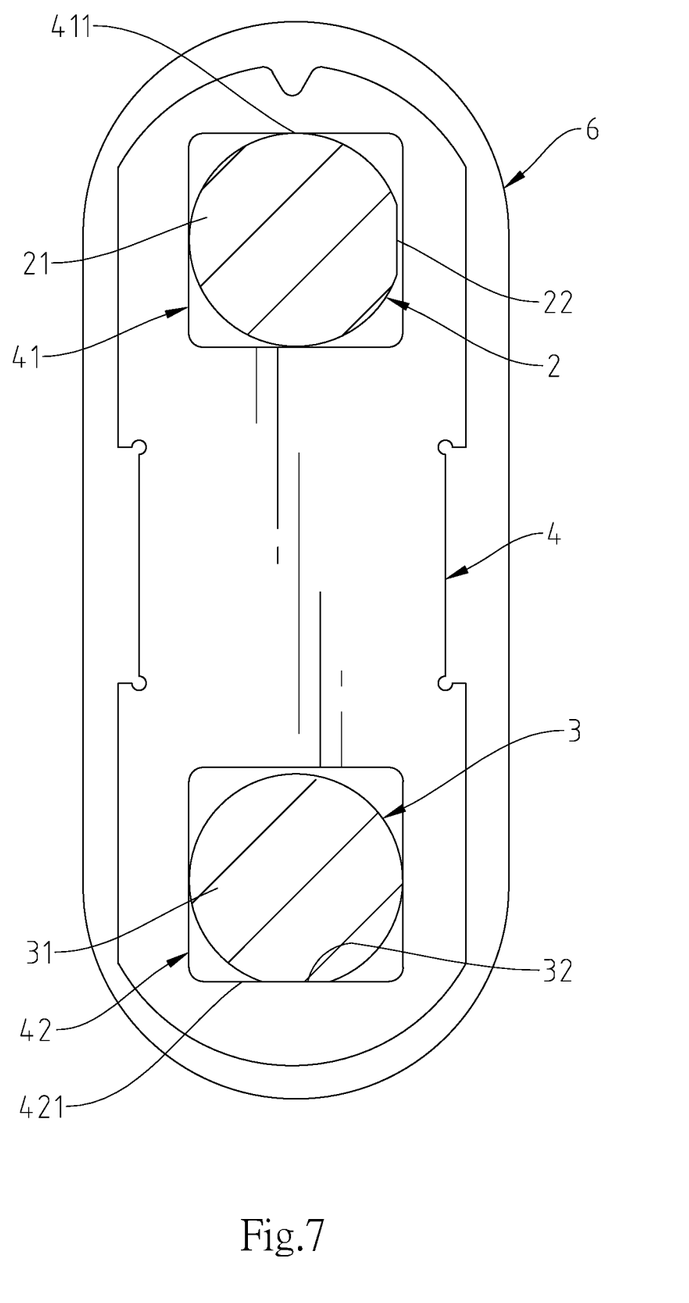
FIG. 7 is a schematic sectional operational view of the first embodiment of the present invention, illustrating the relative positioning between the first and second pivot shafts and the angle control plate (I).
Figure 8:
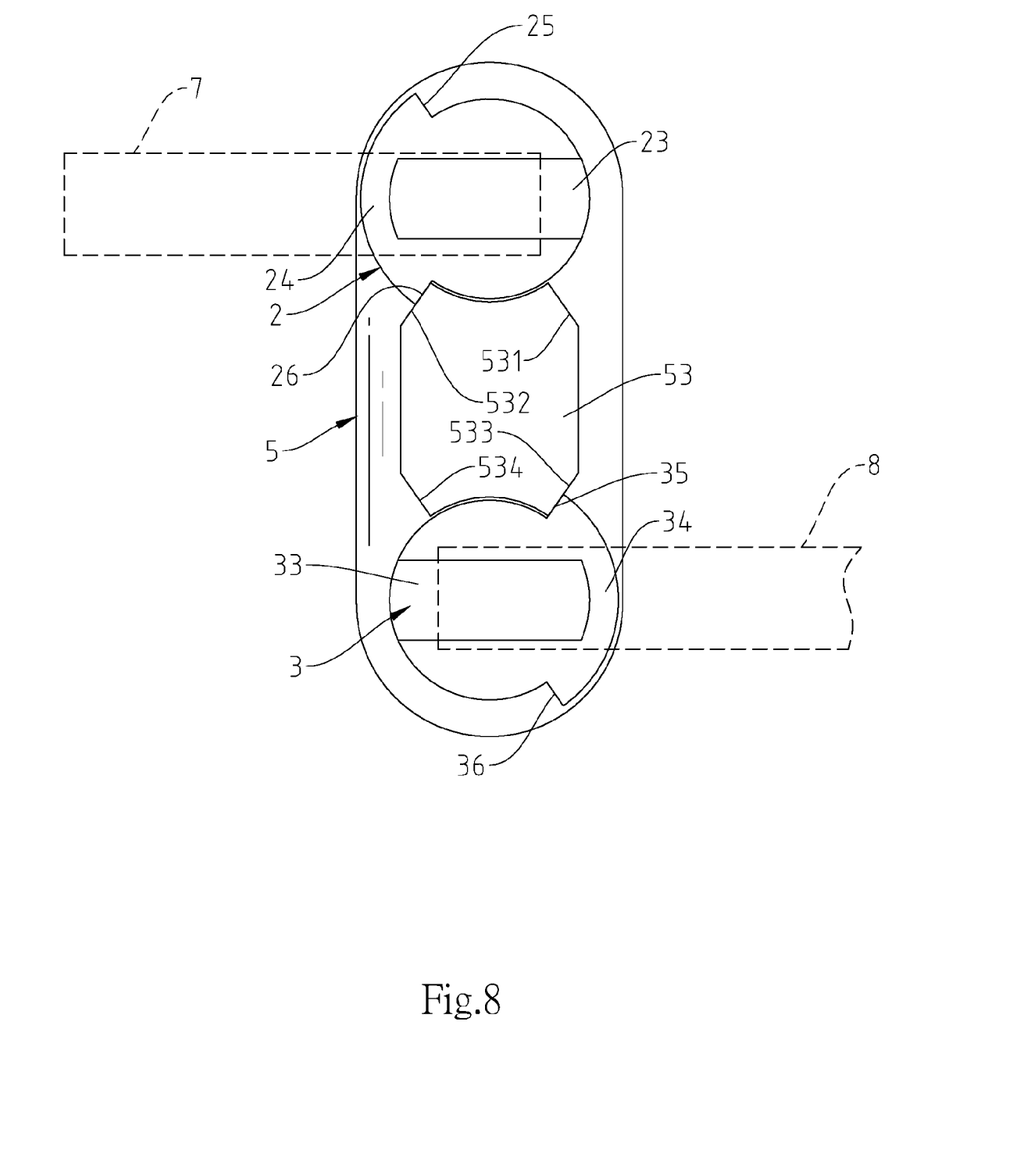
FIG. 8 is a schematic sectional operational view of the first embodiment of the present invention, illustrating the relative positioning between the first and second pivot shafts and the positioning member (II).
Figure 9:
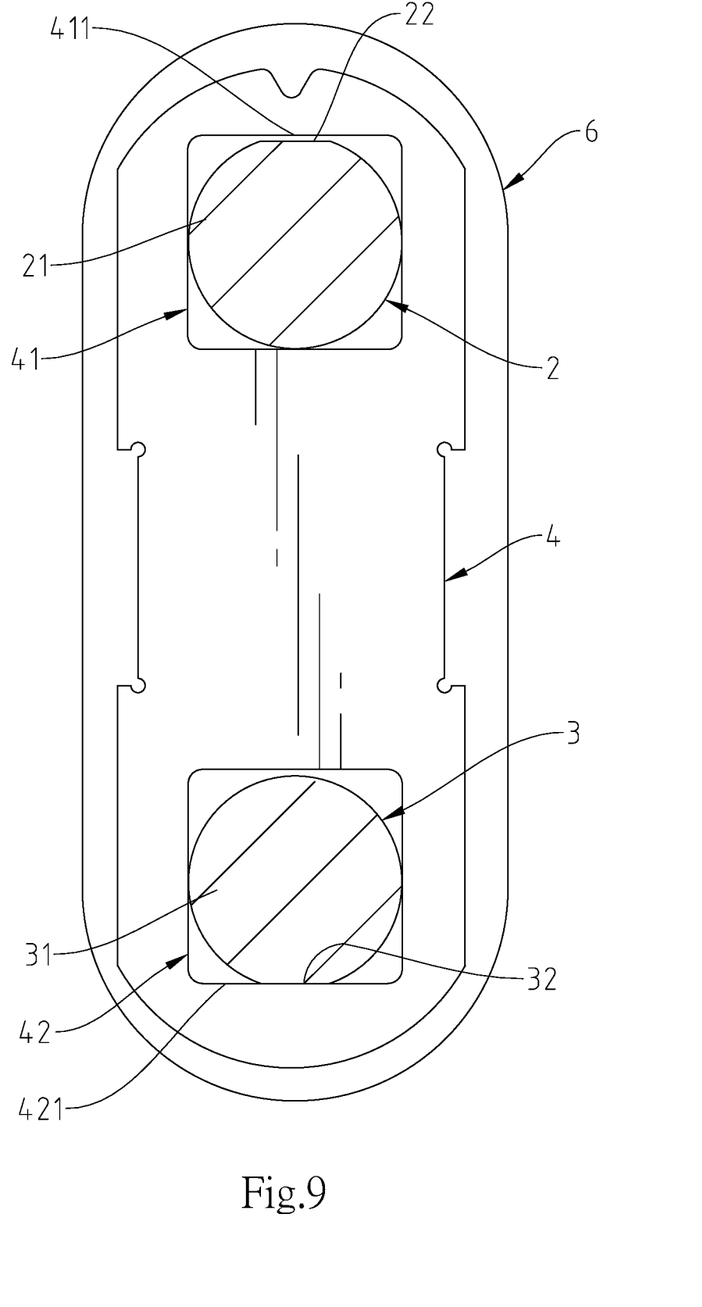
FIG. 9 is a schematic sectional operational view of the first embodiment of the present invention, illustrating the relative positioning between the first and second pivot shafts and the angle control plate (II).
Figure 10:
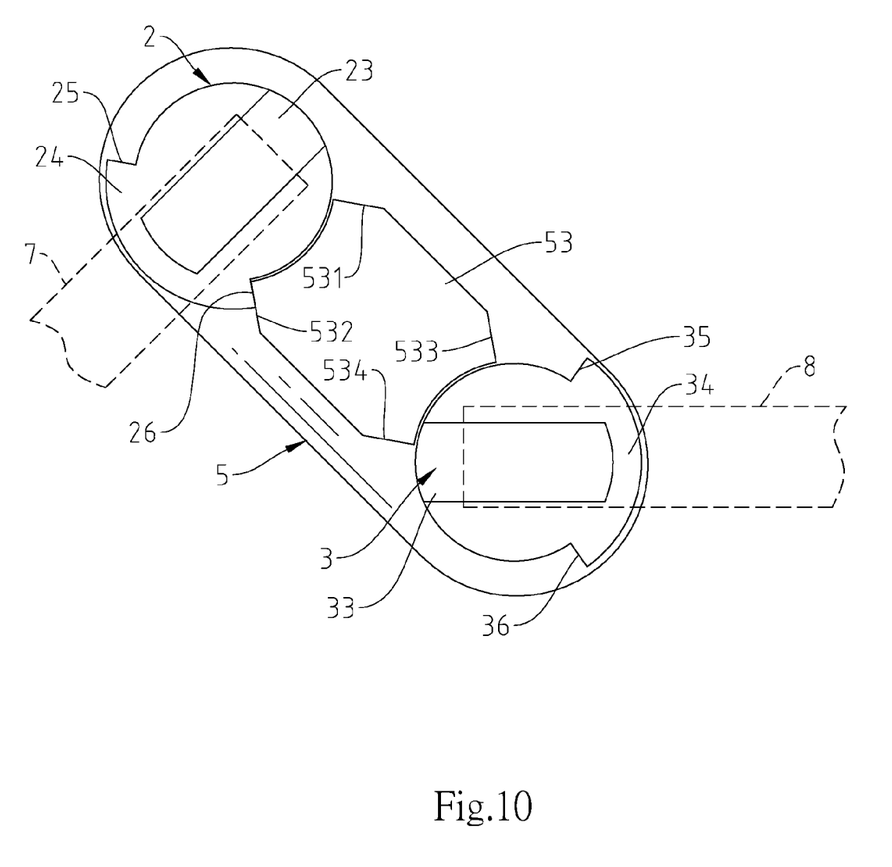
FIG. 10 is a schematic sectional operational view of the first embodiment of the present invention, illustrating the relative positioning between the first and second pivot shafts and the positioning member (III).
Figure 11:
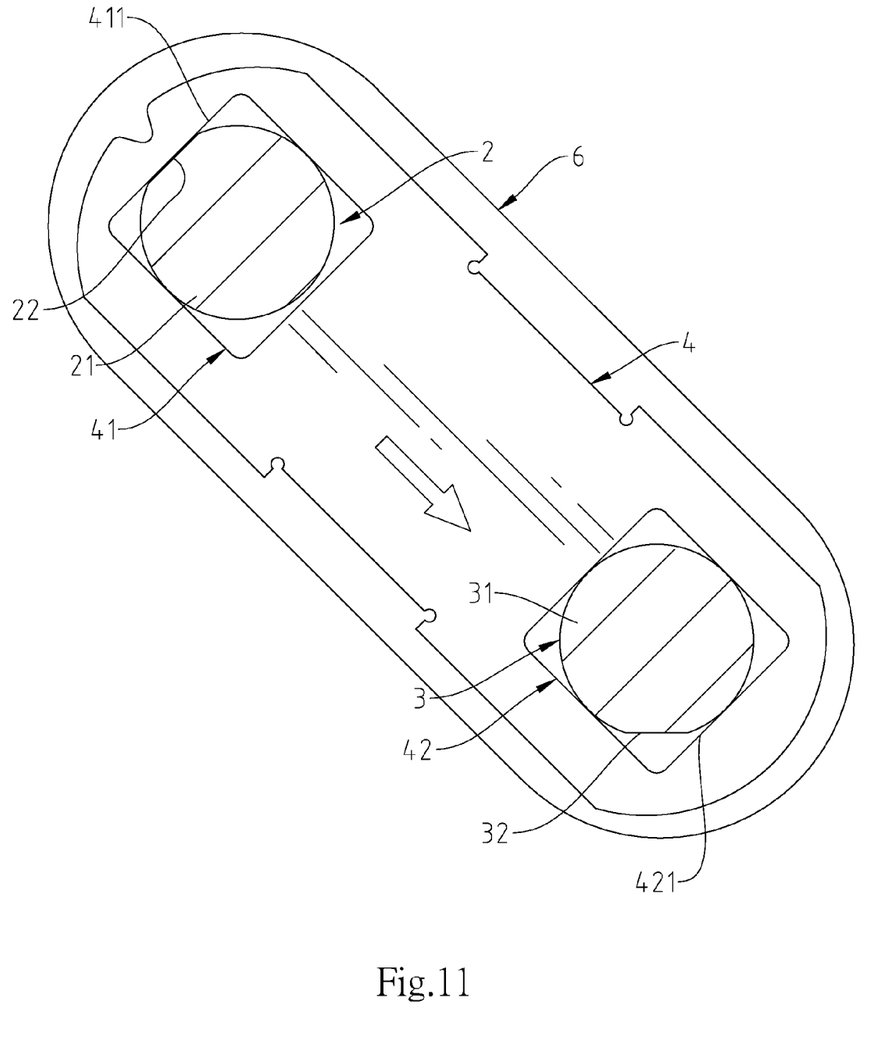
FIG. 11 is a schematic sectional operational view of the first embodiment of the present invention, illustrating the relative positioning between the first and second pivot shafts and the angle control plate (III).
Figure 12:
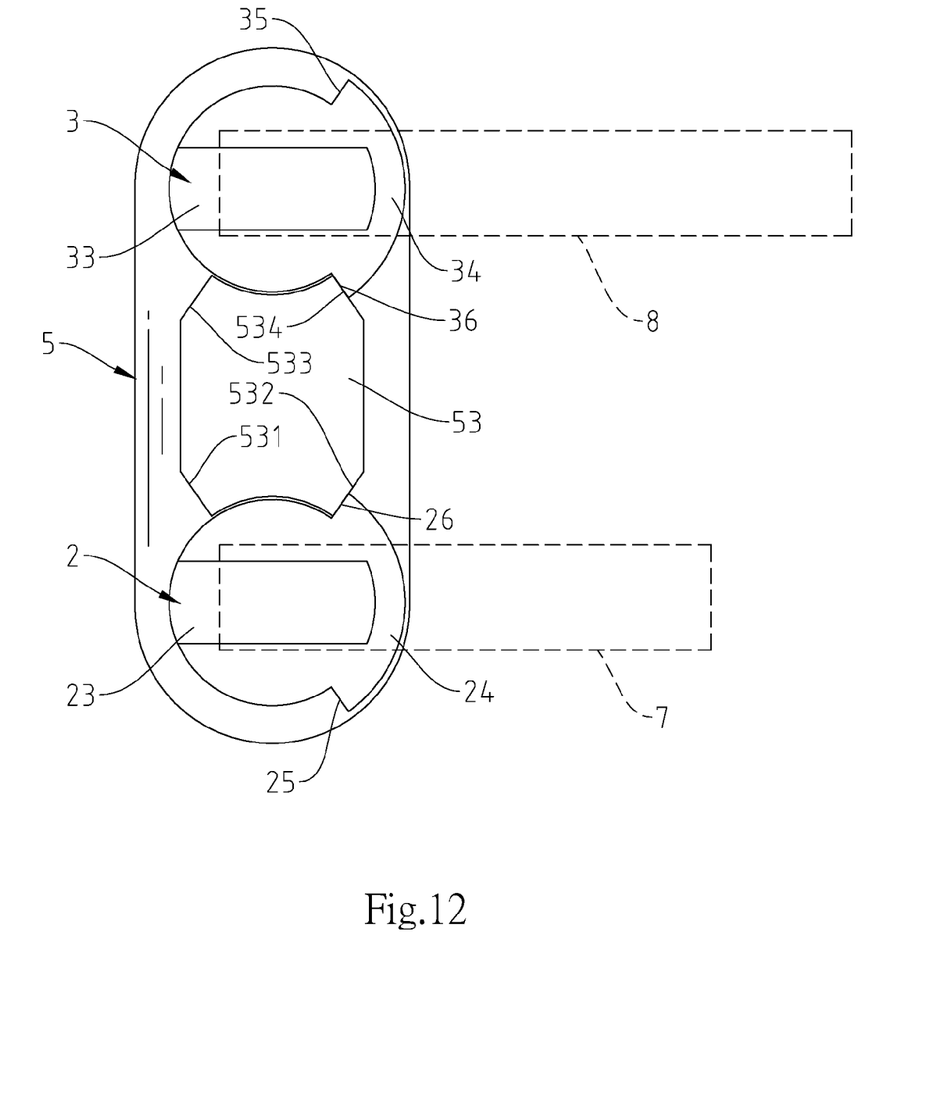
FIG. 12 is a schematic sectional operational view of the first embodiment of the present invention, illustrating the relative positioning between the first and second pivot shafts and the positioning member (IV).
Figure 13:
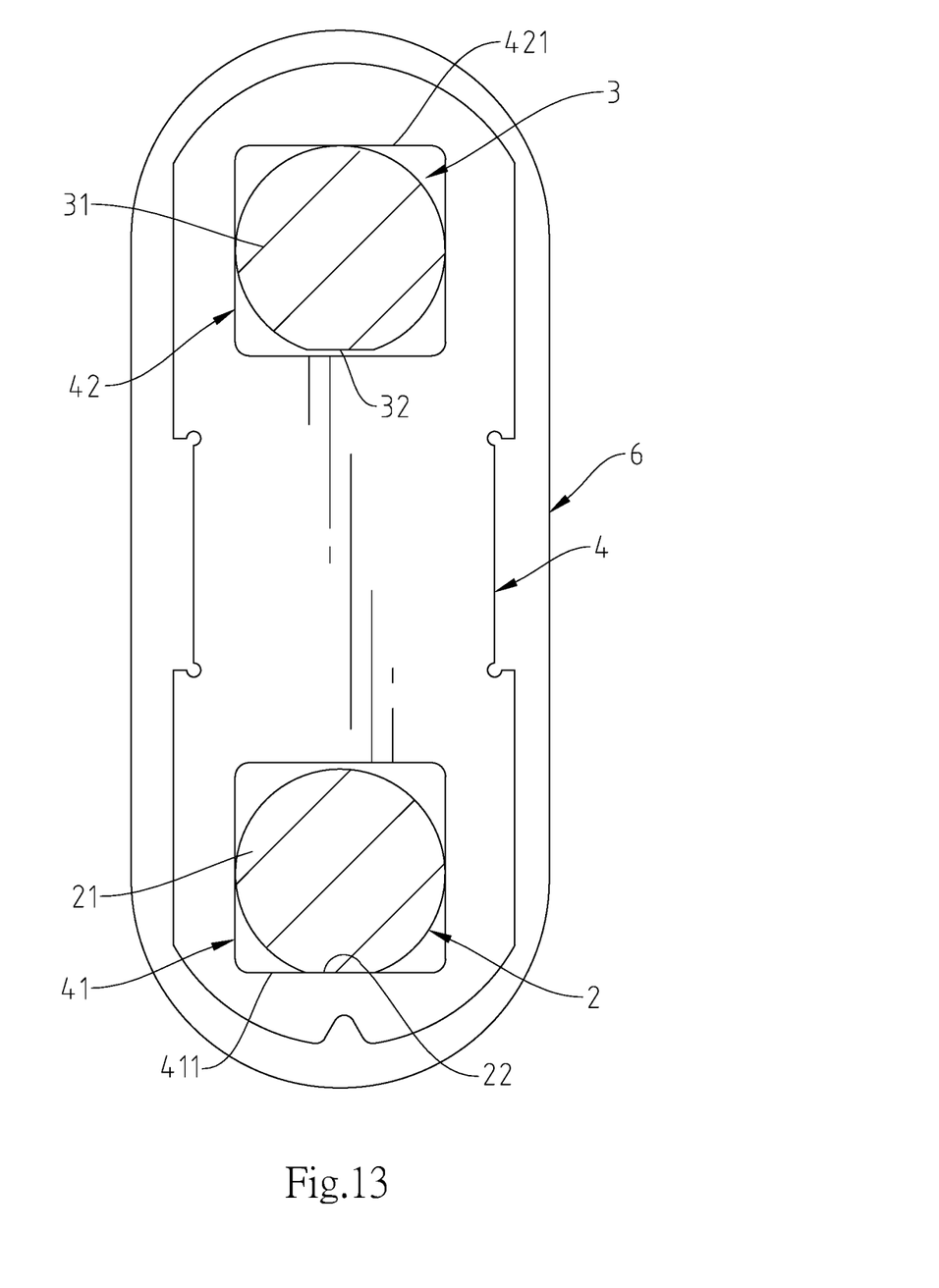
FIG. 13 is a schematic sectional operational view of the first embodiment of the present invention, illustrating the relative positioning between the first and second pivot shafts and the angle control plate (IV).

Referring to FIG. 2 and FIGS. 4-13, as illustrated in FIG. 4 and FIG. 5, the first connection bar 23 of the first pivot shaft 2 and the second connection bar 33 of the second pivot shaft 3 are respectively connected to a cover member 7 and a base member 8 of a dual leaf electronic device. If the cover member 7 is closed on the top surface of the base member 8, the first cut plane 22 of the first pivot shaft 2 is kept far from the first abutment edge 411 of the angle control plate 4, the second cut plane 32 of the second pivot shaft 3 faces toward the second abutment edge 421 of the angle control plate 4, the first start surface 25 of the first pivot shaft 2 is abutted against the first stop edge 531 of the positioning member 5, and the second start surface 35 of the second pivot shaft 3 is abutted against the third stop edge 533 of the positioning member 5. Subject to the characteristic that the distance from the center of the first position-limit hole 41 to the center of the second position-limit hole 42 is smaller than the distance from the axis of the first shaft body 21 to the axis of the second shaft body 31 and the characteristic that the difference between the distance from the center of the first position-limit hole 41 to the axis of the first shaft body 21 and the distance from the center of the second position-limit hole 42 to the axis of the second shaft body 31 is equal to the difference between the radius of the first shaft body 21 and the distance from the axis of the first shaft body 21 to the first cut plane 22 and also equal to the difference between the radius of the second shaft body 31 and the distance from the axis of the second shaft body 31 to the second cut plane 32, when the cover member 7 is closed on the top surface of the base member 8, the first cut plane 22 of the first pivot shaft 2 is kept far from the first abutment edge 411 of the angle control plate 4, the second cut plane 32 of the second pivot shaft 3 faces toward the second abutment edge 421 of the angle control plate 4, and the second abutment edge 421 is abutted against the second cut plane 32, and thus, the first pivot shaft 2 is rotatable and the second pivot shaft 3 is held down in position. If the user turns the cover member 7 toward the bottom surface of the base member 8 at this time (as illustrated in FIG. 6 and FIG. 7), the cover member 7 will drive the first pivot shaft 2 to rotate. As illustrate in FIG. 8 and FIG. 9, when the cover member 7 drives the first pivot shaft 2 to rotate to the angle where the first cut plane 22 faces toward the first abutment edge 411 of the angle control plate 4, the first end surface 26 of the first stop flange 24 is forced into abutment against the second stop edge 532 and prohibited from biasing toward the base member 8. Because the first cut plane 22 faces toward the first abutment edge 411 and the second cut plane 32 faces toward the second abutment edge 421 at this time, the first pivot shaft 2 and the second pivot shaft 3 are rotatable, however, the first stop flange 24 stops the first pivot shaft 2 from biasing, thus, the biasing force applied by the user to the cover member 7 at this time will force the axle housing 1 to turn about the second shaft body 31 (as illustrated in FIG. 10 and FIG. 11). Similarly, when the second cut plane 32 of the second shaft body 31 is turned away from the second abutment edge 421, the first cut plane 22 will be forced into abutment against the first abutment edge 411 to stop the first pivot shaft 2 from rotation, and the second stop flange 34 will be constrained by the third stop edge 533 and the fourth stop edge 534 to rotate within a predetermined angle. Thus, the cover member 7 can be turned to the bottom surface of the base member 8 segmentally.

Figure 14:
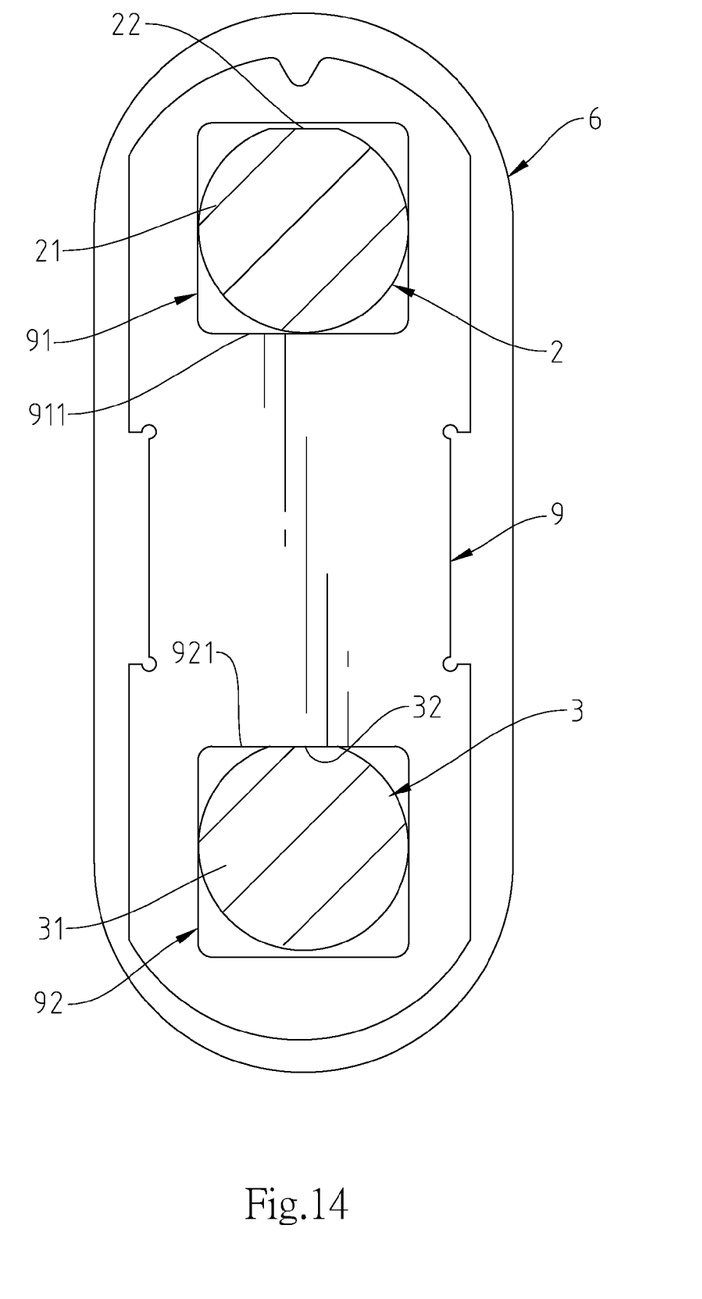
FIG. 14 is a schematic sectional view of the present invention, illustrating an alternate form of the angle control plate.

Referring to FIG. 14, a segmental rotation type dual-shaft hinge in accordance with a second embodiment of the present invention is shown. This second embodiment is substantially similar to the aforesaid first embodiment with the exception of the angle control plate. The differences between the angle control plate 9 of this second embodiment and the angle control plate 4 of the aforesaid first embodiment are outlined hereinafter with reference to FIGS. 5 and 14.

The angle control plate 9 comprises a first position-limit hole 91, a second position-limit hole 92, a first abutment edge 911 located in the first position-limit hole 91 adjacent to the second position-limit hole 92, a second abutment edge 921 located in the second position-limit hole 92 adjacent to the first position-limit hole 91. Further, the distance from the center of the first position-limit hole 91 to the center of the second position-limit hole 92 is larger than the distance from the axis of the first shaft body 21 to the axis of the second shaft body 31. Further, the difference between the distance from the center of the first position-limit hole 41 to the axis of the first shaft body 21 and the distance from the center of the second position-limit hole 42 to the axis of the second shaft body 31 is equal to the difference between the radius of the first shaft body 21 and the distance from the axis of the first shaft body 21 to the first cut plane 22, and also equal to the difference between the radius of the second shaft body 31 and the distance from the axis of the second shaft body 31 to the second cut plane 32. Thus, this second embodiment can also let the first pivot shaft 2 and the second pivot shaft 3 to be rotated segmentally.

What is claimed is:

1. A segmental dual-shaft hinge, comprising:
   an axle housing defining therein a first pivot shaft chamber and a second pivot shaft chamber;
   a first pivot shaft comprising a first shaft body pivotally coupled to said first pivot shaft chamber of said axle housing and a first cut plane located on a periphery of said first shaft body;
   a second pivot shaft comprising a second shaft body pivotally coupled to said second pivot shaft chamber of said axle housing and a second cut plane located on a periphery of said second shaft body; and
   an angle control plate disposed at a lateral side of said axle housing, said angle control plate comprising a first position-limit hole and a second position-limit hole respectively kept in axial alignment with said first pivot shaft chamber and said second pivot shaft chamber of said axle housing and respectively pivotally coupled to said first shaft body and said second shaft body, a first abutment edge located in said first position-limit hole remote from said second position-limit hole and a second abutment edge located in said second position-limit hole remote from said first position-limit hole, an inner diameter of said first position-limit hole mating with an outer diameter of said first shaft body of said first pivot shaft, an inner diameter of said second position-limit hole mating with an outer diameter of said second shaft body of said second pivot shaft, a distance from a center of said first position-limit hole to a center of said second position-limit hole being smaller than a distance from a longitudinal axis of said first shaft body to a longitudinal axis of said second shaft body.

2. The segmental dual-shaft hinge as claimed in claim 1, wherein said axle housing comprises a base, a flat first surface located at a top side of said base, a second surface located at an opposing bottom side of said base parallel to said first surface, a first bearing portion curving from a right lateral side of said first surface in a direction toward an opposite left lateral side of said first surface, a first pivot shaft chamber defined between said first surface and said first bearing portion, a second bearing portion curving from a left lateral side of said second surface in direction toward an opposing right lateral side of said second surface and a second pivot shaft chamber defined between said second surface and said second bearing portion, said first bearing portion and said second bearing portion extending in reversed directions.

3. The segmental dual-shaft hinge as claimed in claim 1, wherein said first pivot shaft further comprises a first connection bar axially extending from an end of said first shaft body, a first stop flanged extending around an end of said first connection bar adjacent to said first shaft body, a first start surface located at a side of said first stop flange and a first end surface located at an opposite side of said first stop flange; said second pivot shaft further comprises a second connection bar axially extending from an end of said second shaft body, a second stop flange extended around an end of said second connection bar adjacent to said second shaft body, a second start surface located at a side of said second stop flange and a second end surface located at an opposite side of said second stop flange; the segmental dual-shaft hinge further comprising a positioning member attached to a side of said angle control plate opposite to said axle housing, said positioning member comprising a first positioning hole and a second positioning hole respectively disposed in axial alignment with said first position-limit hole and said second position-limit hole of said angle control plate and a stop block located on a side thereof between said first positioning hole and said second positioning hole, said stop block comprising a first stop edge and a second stop edge bilaterally disposed at a side thereof adjacent to said first positioning hole and a third stop edge and a fourth stop edge bilaterally disposed at an opposite side thereof adjacent to said second positioning hole, said first positioning hole and said second positioning hole being respectively pivotally coupled to said first shaft body and said second shaft body so that said first stop flange is disposed between said first stop edge and said second stop edge and said second stop flange is disposed between said third stop edge and said fourth stop edge.

4. A segmental dual-shaft hinge, comprising:

an axle housing defining therein a first pivot shaft chamber and a second pivot shaft chamber;

a first pivot shaft comprising a first shaft body pivotally coupled to said first pivot shaft chamber of said axle housing and a first cut plane located on a periphery of said first shaft body;

a second pivot shaft comprising a second shaft body pivotally coupled to said second pivot shaft chamber of said axle housing and a second cut plane located on a periphery of said second shaft body; and an angle control plate disposed at a lateral side of said axle housing, said angle control plate comprising a first position-limit hole and a second position-limit hole respectively kept in axial alignment with said first pivot shaft chamber and said second pivot shaft chamber of said axle housing and respectively pivotally coupled to said first shaft body and said second shaft body, a first abutment edge located in said first position-limit hole adjacent to said second position-limit hole and a second abutment edge located in said second position-limit hole adjacent to said first position-limit hole, an inner diameter of said first position-limit hole mating with an outer diameter of said first shaft body of said first pivot shaft, an inner diameter of said second position-limit hole mating with an outer diameter of said second shaft body of said second pivot shaft, a distance from a center of said first position-limit hole to a center of said second position-limit hole being larger than a distance from a longitudinal axis of said first shaft body to a longitudinal axis of said second shaft body.

5. The segmental dual-shaft hinge as claimed in claim 4, wherein said axle housing comprises a base, a flat first surface located at a top side of said base, a second surface located at an opposing bottom side of said base parallel to said first surface, a first bearing portion curving from a right lateral side of said first surface in a direction toward an opposite left lateral side of said first surface, a first pivot shaft chamber defined between said first surface and said first bearing portion, a second bearing portion curving from a left lateral side of said second surface in a direction toward an opposing right lateral side of said second surface and a second pivot shaft chamber defined between said second surface and said second bearing portion, said first bearing portion and said second bearing portion extending in reversed directions.

6. The segmental dual-shaft hinge as claimed in claim 4, wherein said first pivot shaft further comprises a first connection bar axially extending from an end of said first shaft body, a first stop flanged extending around an end of said first connection bar adjacent to said first shaft body, a first start surface located at a side of said first stop flange and a first end surface located at an opposite side of said first stop flange; said second pivot shaft further comprises a second connection bar axially extending from an end of said second shaft body, a second stop flange extending around an end of said second connection bar adjacent to said second shaft body, a second start surface located at a side of said second stop flange and a second end surface located at an opposite side of said second stop flange; the segmental dual-shaft hinge further comprising a positioning member attached to a side of said angle control plate opposite to said axle housing, said positioning member comprising a first positioning hole and a second positioning hole respectively disposed in axial alignment with said first position-limit hole and said second position-limit hole of said angle control plate and a stop block located on a side thereof between said first positioning hole and said second positioning hole, said stop block comprising a first stop edge and a second stop edge bilaterally disposed at a side thereof adjacent to said first positioning hole and a third stop edge and a fourth stop edge bilaterally disposed at an opposite side thereof adjacent to said second positioning hole, said first positioning hole and said second positioning hole being respectively pivotally coupled to said first shaft body and said second shaft body so that said first stop flange is disposed between said first stop edge and said second stop edge and said second stop flange is disposed between said third stop edge and said fourth stop edge.

\* \* \* \* \*